United States Patent
Viola et al.

(10) Patent No.: US 6,228,952 B1
(45) Date of Patent: May 8, 2001

(54) PROCESS FOR THE HYDROGENATION OF DIENE (CO)POLYMERS

(75) Inventors: Gian Tommaso Viola, Cervia; Andrea Vallieri, Comacchio; Claudio Cavallo, Forli, all of (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/184,114

(22) Filed: Nov. 2, 1998

(30) Foreign Application Priority Data

Nov. 6, 1997 (IT) .............................. MI97A2477

(51) Int. Cl.⁷ ...................................... C08F 8/04
(52) U.S. Cl. .................... 525/338; 502/104; 502/115; 502/117; 525/332.8; 525/332.9; 525/333.1; 525/333.2; 525/339
(58) Field of Search .................... 502/104, 115, 502/117; 525/332.8, 332.9, 333.1, 333.2, 338, 339

(56) References Cited

U.S. PATENT DOCUMENTS 5,244,980  9/1993  Gibler et al. .
5,397,757  3/1995  Mink et al. .

FOREIGN PATENT DOCUMENTS 0 339 986   11/1989  (EP) .
0 816 382    1/1998  (EP) .
8-27216      1/1996  (JP) .

Primary Examiner—Bernard Lipman
(74) Attorney, Agent, or Firm—Oblon, Spivak, McClelland, Maier & Neustadt, P.C.

(57) ABSTRACT

Catalytic composition effective in the hydrogenation of olefinic double bonds prepared by reaction between:

(A) at least one cyclopentadienyl complex of a transition metal having general formula (I) $(R)(R^1)M_1(R^2)(R^3)$ wherein R is an anion containing an $\eta^5$-cyclopentadienyl ring coordinated to $M_1$; $M_1$ is selected from titanium, zirconium and hafnium; $R^2$ and $R^3$, the same or different, are organic or inorganic anion groups bound to $M_1$; $R^1$ is selected from cyclopentadienyl and $R^2$;

(B) an alkylating composition essentially consisting of:
   (b1) an organometallic compound having general formula (II) $M_2(R^4)(R^5)$, wherein $M_2$ is selected from Zn and Mg;
   (b2) an organoderivative of aluminum having general formula (III) $Al(R^6)_3$.

21 Claims, No Drawings

PROCESS FOR THE HYDROGENATION OF DIENE (CO)POLYMERS

The present invention relates to a catalytic composition which can be used for the hydrogenation of olefinically unsaturated compounds, particularly for the selective hydrogenation of polymers and copolymers of conjugated dienes.

Polymers obtained by the (co)polymerization of conjugated dienes are widely used on a commercial scale.

In the polymeric chain these (co)polymers have olefinic double bonds which, useful when used in vulcanization, are responsible for a poor stability, particularly resistance to oxidation.

In particular, the block copolymers obtained starting from conjugated dienes and vinyl substituted aromatic hydrocarbons are adopted non-vulcanized as thermoplastic elastomers or as shock-resistant transparent resins or as modifiers of styrene resins or olefinic resins. Owing to the presence of unsaturated double bonds in the polymeric chain, the above block copolymers have a poor resistance to oxidation, ozone and atmospheric aging. This is a great disadvantage for their application.

This lack of stability can be greatly reduced by selectively hydrogenating the olefinic double bonds of the above copolymers.

The known methods for hydrogenating polymers having olefinic double bonds are based on (1) supported heterogeneous catalysts consisting of inert carriers (for example silica, alumina, carbon) on which a metal such as nickel, platinum, palladium, etc. is deposited and (2) non-supported homogeneous catalysts obtained by reacting an organometallic compound of nickel, cobalt, titanium or the like, with a reducing compound such as an organo-aluminum, an organomagnesium or an organolithium.

With respect to supported heterogeneous catalysts (1), non-supported catalysts (2) have the quality of a greater activity. This is a considerable advantage as it allows blander hydrogenation conditions to be adopted, with smaller quantities of catalyst.

U.S. Pat. No. 4,501,857 describes a hydrogenation process of non-living polymers carried out in the presence of (A) a bis-(cyclopentadienyl) titanium derivative and (B) at least one organolithium derivative, the molar ratio between lithium atoms and titanium atoms being from 0.1 to 100.

EP-A-434.469 describes a catalytic composition which comprises (a) at least one titanium bis-cyclopentadienyl derivative and (b) at least one compound selected from those having general formula (i) $M^2(AlR^aR^bR^cR^d)$ and (ii) $M^2(MgR^eR^fR^g)$, wherein $M^2$, is selected from lithium, sodium and potassium. Compound (i) can be obtained by the reaction of an organ-alkaline compound with an organo-aluminum compound, whereas compound (ii) can be obtained by the reaction of an organo-alkaline compound with an organo-magnesium derivative.

EP-A-601.953 describes a hydrogenation process carried out in the presence of a catalyst having the general formula $Cp_2Ti(PhOR)_2$ or $Cp_2Ti(CH_2PPh_2)_2$.

All the above processes differ in reality not so much in the hydrogenation reaction as in the preparation process of the catalytic species.

The process described in U.S. Pat. No. 4,501,857 is the simplest among those mentioned as it starts from a compound which is easily available on the market (titaniumdicyclopentadienylchloride) and involves only the addition of an organic lithium derivative. Unfortunately the data provided by this patent show how the process, which is very effective when applied to living polymers, gives a poor hydrogenation yield when applied to non-living polymers (see Table III compared with Table II).

On the other hand, EP-A-434.469 comprises the presence of compounds (i) or (ii), which require the reaction, not included in U.S. Pat. No. 4,501,857, between an organoalkaline derivative (usually an organolithium derivative) and an organo-aluminum or organo-magnesium derivative, with the Titanium compound.

The process of EP-A-601.953 is also complex as it involves the preparation and isolation of particular titanium dicyclopentadienyl derivatives obtained starting from $Cp_2TiCl_2$.

In any case all the catalysts of the prior art have the disadvantage of requiring high quantities of Titanium; in addition the hydrogenation rates are unsatisfactory.

A catalytic composition has now been found which can be used in the selective hydrogenation of olefinic double bonds which overcomes the above drawbacks as it is simple to prepare and is also much more active than the catalysts described in the above patents.

In accordance with this, the present invention relates to a catalytic composition effective in the hydrogenation of olefinic double bonds, particularly in the selective hydrogenation of olefinic double bonds present in copolymers between dienes and vinylbenzenes, even more particularly styrene-butadiene and styrene-isoprene block copolymers, prepared by reaction between:

(A) at least one cyclopentadienyl complex of a transition metal having general formula (I) $(R)(R^1)M_1(R^2)(R^3)$ wherein R is an anion containing an $\eta^5$-cyclopentadienyl ring coordinated to $M_1$ and is preferably cyclopentadienyl;

$M_1$ is selected from titanium, zirconium and hafnium, preferably titanium;

$R^2$ and $R^3{}_1$ the same or different, are organic or inorganic anion groups bound to $M_1$, preferably selected from hydride, halide, $C_1$–$C_8$ alkyl group, $C_5$–$C_8$ cycloalkyl group, $C_6$–$C_{10}$ aryl group, $C_1$–$C_8$ alkoxyl group, $C_1$–$C_8$ carboxyl group; even more preferably they are both equal to chloride;

$R^1$ is selected from cyclopentadienyl and $R^2$;

with (B) an alkylating composition essentially consisting of:

(b1) an organometallic compound having general formula (II) $M_2(R^4)(R^5)$, wherein $M_2$ is selected from Zn and Mg and is preferably Mg, $R^4$ is selected from aliphatic or aromatic hydrocarbon radicals having from 1 to 20 carbon atoms, preferably $C_1$–$C_{16}$ aliphatic hydrocarbon radicals, even more preferably $C_1$–$C_8$; $R^5$ is a halogen or is equal to $R^4$;

(b2) an organoderivative of Aluminum having general formula (III) $Al(R^6)_3$, wherein $R^6$ is a $C_1$–$C_{16}$ aliphatic hydrocarbon radical, preferably $C_1$–$C_8$.

The preparation of the catalytic composition of the present invention takes place by mixing the cyclopentadienyl derivative having general formula (I) with alkyating agents (b1) and (b2). In the preferred embodiment, all the components are dissolved in inert solvents. More specifically the alkylating composition can be dissolved in a single solvent.

In the preferred embodiment the molar ratio between the compound having general formula (I) and the alkylating compound (b1) is from 1/1 to 1/10, preferably from 1/3 to 1/7; the molar ratio between (b2) and (I) is less than 1, preferably from 0.3/1 to 0.9/1.

As specified above, in the preferred embodiment, in the compound having general formula (I), $M_1$ is Ti, $R^1$ is cyclopentadienyl, whereas $R^2$ and $R^3$ are halides, preferably chlorides. Other non-limiting examples of compounds having general formula (I) are listed below:

($\eta^5$-$C_5H_5$)TiCl$_3$, ($\eta^5$-THInd)TiCl$_3$
($\eta^5$-Ind)Ti(NMe$_2$)$_3$, ($\eta^5$-Flu)TiCl$_3$
($\eta^5$-$C_5$Me$_5$)TiC$_3$, ($\eta^5$-$C_5H_5$)TiCl$_2$Me
($\eta^5$-Ind)Ti(OMe)$_3$, ($\eta^5$-Ind)TiCl$_3$
($\eta^5$-$C_5H_5$)TiCl$_2$Ph, ($\eta^5$-Flu)Ti(OBu)$_3$
($\eta^5$-$C_5H_5$)$_2$TiCl$_2$, ($\eta^5$-THInd)$_2$TiCl$_2$
($\eta^5$-Ind)$_2$Ti(NMe$_2$)$_2$, ($\eta^5$-Flu)$_2$TiCl$_2$
($\eta^5$-$C_5$Me$_5$)$_2$TiCl$_2$, ($\eta^5$-$C_5H_5$)$_2$TiClMe
($\eta^5$-Ind)$_2$Ti(OMe)$_2$, ($\eta^5$-Ind)$_2$TiCl$_2$
($\eta^5$-$C_5H_5$)$_2$TiClPh, ($\eta^5$-Flu)$_2$Ti(OBu)$_2$ The following abbreviations were used in the above formulae: Me=methyl, Bu=butyl, Ind=indenyl, THInd=4,5,6,7-tetrahydro-indenyl, Flu=fluorenyl, Ph=phenyl, Et=ethyl.

The alkylating component (b1) is preferably selected from alkylmagnesium halides, normally known as Grignard compounds, and Magnesium dialkyls. Both groups of products are well known and there are numerous methods for their preparation. Many organometallic compounds having general formula (II) $M_2(R^4)(R^5)$, wherein $M_2$ is selected from Zn and Mg, are commercial products, normally in the form of solutions in an inert hydrocarbon solvent. Preferred organometallic compounds are magnesium dialkyls, i.e. compounds having general formula (II) wherein both $R^4$ and $R^5$ are selected from $C_1$–$C_{16}$, preferably $C_1$–$C_{10}$ linear or branched alkyls. Typical examples of magnesium dialkyls are magnesium di-n-butyl, magnesium di-isobutyl, magnesium di-isopropyl, magnesium butyl-isobutyl, magnesium di-cyclohexyl, magnesium butyl-octyl and relative mixtures.

As far as compound (b2) is concerned, $Al(R^6)_3$ is a trialkyl aluminum, wherein $R^6$ is a $C_1$–$C_{16}$ preferably $C_1$–$C_8$, aliphatic hydrocarbon radical. Aluminum trialkyls are also commercially available; typical examples are aluminum tri-ethyl, aluminum tri-isobutyl, aluminum tri-isopropyl, and relative mixtures.

The preparation of the catalytic composition of the present invention is preferably carried out in an inert atmosphere. The term "inert atmosphere" means an atmosphere of one or more gases which do not react with any of the species present in the reaction environment. Typical examples of these gases are helium, neon, argon and the relative mixtures. Alternatively hydrogen can also be used. Air and oxygen are not appropriate because they oxidate or decompose the hydrogenation catalyst making it inactive.

According to another embodiment of the present invention, the catalytic composition of the present invention can be prepared in the presence of the catalytic compound which is to be hydrogenated. The latter can form the diluent itself in which the preparation of the catalyst is effected, or it can be mixed with an inert diluent of the type described above. In particular, especially in the case of non-polymeric unsaturated compounds, the component to be hydrogenated can be added entirely or partially to component (A) before the reaction with component (B). Alternatively, the unsaturated compound is added after contact between (A) and (B), but before introducing the hydrogen.

The present invention also relates to a process for the hydrogenation of olefinic double bonds present both in compounds having a low molecular weight, and in unsaturated oligomers or polymers and copolymers, preferably obtained by the (co)polymerization of conjugated dienes, which comprises putting the substrate to be hydrogenated in contact with hydrogen in an inert solvent, in the presence of the catalytic composition according to claim 1, for a period sufficient to obtain a selective hydrogenation of at least 50%, preferably at least 90% of the olefinc double bonds.

Non-polymeric substrates which can be hydrogenated according to the process of the present invention consist of the usual aliphatic and aromatic olefins having from 2 to 30, preferably from 4 to 25, carbon atoms, such as ethylene, propylene, butenes, octenes, cyclohexene, cyclohexadiene, undecene, cyclododecatetraene, norbornene, styrene (selective hydrogenation to ethylbenzene), divinylbenzenes, conjugated dienes such as butadiene, isoprene, chloroprene, non-conjugated dienes such as ethylidenenorbornadiene, 1,4-hexadiene and the like, acetylene derivatives such as acetylene, 2-butine, 1-hexine. Equally suitable as substrates are also olefins and styrene derivatives comprising heteroatoms such as, for example, halogens, especially chlorine and fluorine, silicon, boron, sulfur, oxygen. Other non-polymeric unsaturatetd substrates consist, for example, of esters of unsaturated fatty acids, such as linoleic or ricinoleic acids, esters of unsaturated acids with a short chain such as, for example, acrylic, methacrylic, maleic or fumaric acid; vinyl esters of aliphatic or aromatic acids.

The hydrogenation of these non-polymeric substrates can be carried out in an inert diluent medium, or also on the compound to be hydrogenated as such. The process is carried out in suitable reactors, under hydrogen pressure usually ranging from 0.5 to 10 MPa, preferably at temperatures ranging from 20 to 100° C. and for times varying from 10 minutes to several hours, depending on the substrate to be hydrogenated and the hydrogenation degree desired. Blander conditions can be used, for example, if a primary double bond is to be hydrogenated, leaving a secondary one intact in a non-conjugated diene.

With respect to the hydrogenation reaction of (co) polymers, this is carried out under normal conditions (temperature, hydrogen pressure, solvent) well-known in the art. It is possible to use, for example, temperatures ranging from 20 to 150° C., preferably from 70 to 130° C., pressures ranging from 0.1 to 10 MPa, preferably from 0.2 to 5, MPa, the solvents of the (co)polymers preferably consisting of aliphatic or cycloaliphatic, saturated hydrocarbons, having from 6 to 15 carbon atoms and relative mixtures. It is evident that higher temperatures and pressures accelerate the hydrogenation rate.

According to an embodiment, the solution of the (co) polymer to be hydrogenated is charged, under a hydrogen atmosphere, into the hydrogenation reactor followed by the catalyst composition, as such or, preferably, diluted in one or more solvents. The whole mixture is then pressurized with hydrogen and brought to the desired temperature. When the hydrogenation is complete, the hydrogenated (co)polymer is recovered according to the known techniques which comprise, for example, direct distillation of the solvent, or coagulation of the polymer with a non-solvent, its recovery and subsequent drying.

The catalytic compositions which can be obtained with the process of the present invention are also active in the hydrogenation process in very low quantities, indicatively up to 10 ppm of M with respect to the substrate to be subjected to hydrogenation, with a ratio between moles of metal M and olefinic double bonds of up to 1:6.0000. This is a definite advantage with respect to the catalysts of the known art.

The (co)polymers of conjugated dienes mentioned above include homopolymers of conjugated dienes and copolymers obtained by copolymerizing at least one conjugated diene with at least one olefin copolymerizable with the above conjugated diene.

Typical examples of conjugated dienes are 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene and 3-butyl-1,3-octadiene. Isoprene and 1,3-butadiene, more preferably 1,3-butadiene are particularly useful as intermediates for the production of elastomers having excellent physico-chemical properties. Typical examples are therefore polybutadiene, polyisoprene and butadiene/isoprene copolymers.

Olefinic monomers which can be used in the copolymerization together with the dienes listed above, are all unsaturated monomers copolymerizable with the above conjugated dienes, particularly vinyl substituted aromatic hydrocarbons. Among these styrene, t-butyl styrene, alpha-methyl styrene, o-methyl styrene, p-methyl styrene, vinyl naphthalene are particularly suitable. In particular the most useful vinyl aromatic compound is styrene.

Typical examples of block copolymers which can be used as substrates in the hydrogenation process described above are those having general formula $(B-T-A-B)_mX$ and $(A-T-B)_mX$, wherein B are polydiene blocks, the same or different from each other, A is a polyvinylaromatic block, T is a statistic copolymeric segment consisting of diene and vinylaromatic monomeric units, X is a coupling radical with a valence "m", "m" is an integer from 1 to 20, the content of segment T preferably being from 0 to 40% by weight. When "m" is equal to 1, X is the residue of a quenching agent, for example $-Si-(CH_3)_3$ when monochlorotrimethylsilane is used; when "m" is equal to or higher than 2, X is the residue of a coupling agent, such as for example $=Si(CH_3)_2$ in the case of dimethyldichlorosilane, $=Si(CH_3)-$ in the case of methyltrichlorosilane and $=Si=$ in the case of silicon tetrachloride.

In the above block copolymers, the content of vinylsubstituted aromatic hydrocarbons is from 5 to 95%, preferably between 10 and 69%. In the above copolymers, the content of 1,2 or 3,4 units of polydiene phase can vary from 10 to 80%, preferably from 30 to 60%.

As well as the styrene-diene block copolymers mentioned above, it is possible to hydrogenate with the process of the present invention random copolymers with a linear or branched structure having monomers statistically distributed in the polymeric chain and quantities of 1,2 or 3,4 units varying from 10 to 80% by weight.

The (co)polymers which can be used in the process of the present invention do not have a particular molecular weight. However they generally have a number average molecular weight ranging from 1000 to about a million.

The hydrogenation process of the present invention is also possible in the presence of low quantities of metal, especially Titanium. In addition the hydrogenation times are particularly short.

The following examples provide a better illustration of the present invention.

EXAMPLES

EXAMPLE 1

1A) Preparation of the catalytic composition.

20 ml of cyclohexane, 1.8 ml of a solution in THF of $Cp_2TiCl_2$ at a concentration of 10.36 g/l (equivalent to 0.019 g=0.075 mmoles), 0.7 ml of a solution in n-heptane (d=0.730 g/ml) consisting of 10% of Magnesium dibutyl (corresponding to 51.94 g=0.375 mmoles) with a ratio Mg/Ti=5, and 1% of aluminum triethyl (corresponding to 5.19 mg=0.045 mmoles) with a molar ratio Al/Ti=0.6, are charged in order into a 100 ml Schlenk tube, in an argon atmosphere.

1B.1) Hydrogenation reaction 600 grams of a polymeric solution in cyclohexane of the type SBS at 7.5% by weight (with characteristics of 45% of vinyl, a percentage composition of styrene/butadiene 33/67 and Mw of 170000) are transferred into a 1 litre Puchi-type steel reactor; the mixture is stirred at 1000 rpm, hydrogen is charged up to 6 bars and the temperature thermostat-regulated at 100° C. The catalytic composition as per point 1A is added to the reactor thus prepared together with a quantity of Titanium with respect to the dry polymer equal to 80 ppm and with a ratio olefinic double bonds/moles of Titanium equal to 7444. The hydrogen pressure in the reactor is brought to 24 bars. The results obtained in terms of conversion are indicated in Table 1.

1B.2) Hydrogenation reaction 600 grams of a polymeric solution in cyclohexane of the type SBS at 7.5% by weight (with characteristics of 45% of vinyl, a percentage composition of styrene/butadiene 33/67 and Mw of 170000) are transferred into a 1 litre Buchi-type steel reactor; the mixture is stirred at 1000 rpm, hydrogen is charged up to 6 bars and the temperature thermostat-regulated at 130° C.

The catalytic composition as per point 1A is added to the reactor thus prepared together with a quantity of Ti with respect to the dry polymer equal to 80 ppm and with a ratio olefinic double bonds/moles of Ti equal to 7444. The hydrogen pressure in the reactor is brought to 24 bars. The results obtained in terms of conversion are indicated in Table 1.

EXAMPLE 2

2A) Preparation of the catalytic composition 20 ml of cyclohexane, 1.36 ml of a solution in THF of $Cp_2TiCl_2$ at a concentration of 10.36 g/l corresponding to 0.014 g (0.056 mmoles), 0.7 ml of a solution in n-heptane (d=0.730 g/ml) consisting of 10% of magnesium dibutyl therefore 38.94 mg (0.281 mmoles) with a molar ratio Mg/Ti=5, and 1% of aluminum triethyl therefore 3.89 mg (0.034 mmoles) with a ratio Al/Ti=0.6, are charged in order into a 100 ml Schlenk tube, in an argon atmosphere. This mixture is left under stirring in an argon atmosphere for 20 minutes at room temperature.

2B.1) Hydrogenation reaction 600 grams of a polymeric solution in cyclohexane of the type SBS at 7.5% by weight (with characteristics of 45% of vinyl, styrene/butadiene 33/67, Mw=170000) are transferred into a 1 litre Buchi-type steel reactor; the mixture is stirred at 1000 rpm, hydrogen is charged up to 6 bars and the temperature thermostat-regulated at 100° C. The catalytic composition as per point 2A is added to the reactor thus prepared together with a quantity of Titanium with respect to the dry polymer equal to 60 ppm and with a ratio olefinic double bonds/moles of Titanium equal to 10000. The hydrogen pressure in the reactor is brought to 24 bars. The results obtained in terms of conversion are indicated in Table 1.

2B.2) Hydrogenation reaction 600 grams of a polymeric solution in cyclohexane of the type SBS at 7.5% by weight (with characteristics of 45% of vinyl, a percentage composition of styrene/butadiene 33/67 and Mw of 170000) are transferred into a 1 litre Buchi-type steel reactor; the mixture is stirred at 1000 rpm, hydrogen is charged up to 6 bars and the temperature thermostat-regulated at 130° C.

The catalytic composition as per point 2A is added to the reactor thus prepared together with a quantity of Ti with respect to the dry polymer equal to 60 ppm and with a ratio olefinic double bonds/moles of Ti equal to 10000. The hydrogen pressure in the reactor is brought to 24 bars. The results obtained in terms of conversion are indicated in Table 1.

EXAMPLE 3

3A) Preparation of the catalytic composition 20 ml of cyclohexane, 0.87 ml of a solution in THF of $Cp_2TiCl_2$ at a concentration of 10.36 g/l therefore 0.009 g (0.0375 mmoles), 0.35 ml of a solution in n-heptane (d=0.730 g/ml) consisting of 10% of Magnesium dibutyl therefore 25.9 mg (0.187 mmoles), with a ratio Mg/Ti=5, and 1% of aluminum triethyl therefore 2.59 mg (0.023 mmoles) with a ratio Al/Ti=0.6, are charged in order into a 100 ml Schlenk tube, in an argon atmosphere. This mixture is left under stirring in an argon atmosphere for 20 minutes at room temperature.

3B.1) Hydrogenation reaction 600 grams of a polymeric solution in cyclohexane of the type SBS at 7.5% by weight (with characteristics of 45% of vinyl, a percentage composition of styrene/butadiene 33/67, Mw=170000) are charged into a 1 litre Buchi-type stainless steel reactor; the mixture is stirred at 1000 rpm, hydrogen is charged up to 6 bars and the temperature thermostat-regulated at 100° C. The catalytic composition as per point 3A is added to the reactor thus prepared together with a quantity of Titanium with respect to the dry polymer equal to 40 ppm and with a ratio olefinic double bonds/moles of Titanium equal to 15000. The hydrogen pressure in the reactor is brought to 24 bars. The results obtained in terms of conversion are indicated in Table 1.

3B.2) Hydroqenation reaction 600 grams of a polymeric solution in cyclohexane of the type SBS at 7.5% by weight (with characteristics of 45% of vinyl, a percentage composition of styrene/butadiene 33/67 and Mw of 170000) are transferred into a 1 litre Buchi-type steel reactor; the stirring is started at 1000 rpm, hydrogen is charged up to 6 bars and the temperature thermostat-regulated at 130° C. The catalytic composition as per point 3A is added to the reactor thus prepared together with a quantity of Ti with respect to the dry polymer equal to 40 ppm and with a ratio olefinic double bonds/moles of Ti equal to 15000. The hydrogen pressure in the reactor is brought to 24 bars. The results obtained in terms of conversion are indicated in Table 1.

EXAMPLE 4

4A) Preparation of the catalytic composition 20 ml of cyclohexane, 2.8 ml of a solution in THF of $Cp_2TiCl_2$ at a concentration of 10.36 g/l (corresponding to 0.029 grams=0.116 mmoles), 1.1 ml of a solution at 10% of magnesium butyl in n-heptane (corresponding to 80.33 mg=0.58 mmoles), with a ratio Mg/Ti=5, and 1% of aluminum triethyl (corresponding to 8.03 mg=0.070 mmoles), with a ratio Al/Ti=0.6, are charged in order into a 100 ml Schlenk tube, in an argon atmosphere. This mixture is left under stirring in an argon atmosphere for 20 minutes at room temperature.

4B.1) Hydrogenation reaction 400 grams of a polymeric solution in cyclohexane of the type SIS at 11.6% by weight (percentage composition of styrene/isoprene 30/70, average Mw=53300) are charged into a 1 litre Buchi-type steel reactor; the stirring is started at 1000 rpm, hydrogen is charged up to 6 bars and the temperature thermostat-regulated at 100° C. The catalytic composition as per point 4A is added to the reactor thus prepared together with a quantity of Titanium with respect to the dry polymer equal to 120 ppm and with a ratio olefinic double bonds/moles of Ti equal to 4100. The hydrogen pressure in the reactor is brought to 24 bars. The results obtained in terms of conversion are indicated in Table 1.

4B.2) Hydrogenation reaction 400 grams of a polymeric solution in cyclohexane of the type SIS at 11.6% by weight (percentage composition of styrene/isoprene 30/70 and average Mw of 53300) are transferred into a 1 litre Buchi-type steel reactor; the stirring is started at 1000 rpm, hydrogen is charged up to 6 bars and the temperature thermostat-regulated at 130° C. The catalytic composition as per point 4A is added to the reactor thus prepared together with a quantity of Ti with respect to the dry polymer equal to 120 ppm and with a ratio olefinic double bonds/moles of Ti equal to 4100. The hydrogen pressure in the reactor is brought to 24 bars. The results obtained in terms of conversion are indicated in Table 1.

TABLE 1

| | Percentage conversion for the various catalysts | | | | | | | |
|---|---|---|---|---|---|---|---|---|
| Time | Example 1 | | Example 2 | | Example 3 | | Example 4 | |
| min. | 1B.1 | 1B.2 | 2B.1 | 2B.2 | 3B.1 | 3B.2 | 4B.1 | 4B.2 |
| 5 | 99 | 99 | 84.5 | 99 | 40.1 | 68.2 | 12.5 | 22.6 |
| 15 | * | * | 95.6 | * | 71.6 | 87.4 | 25.2 | 43.1 |
| 30 | * | * | 99 | * | 86.7 | 95.8 | 35.7 | 59.8 |
| 60 | * | * | * | * | 96.9 | 99 | 48.4 | 78.5 |
| 90 | * | * | * | * | 99 | * | 52.3 | 87.6 |
| 120 | * | * | * | * | * | * | 53.4 | 90.8 |
| Tem. ° C. | 100 | 130 | 100 | 130 | 100 | 130 | 100 | 130 |
| Ti ppm | 80 | 80 | 60 | 60 | 60 | 40 | 120 | 120 |
| Polymer | SBS | SBS | SBS | SBS | SBS | SBS | SIS | SIS |

COMPARATIVE EXAMPLE 5

5A Preparation of the catalyst 20 ml of cyclohexane, 2.7 ml of a solution in THF of $Cp_2TiCl_2$ at a concentration of 10.36 g/l (corresponding to 0.028 grams=0.112 mmoles), 0.37 ml of a solution at 20% of magnesium dibutyl in n-heptane (corresponding to 108.8 mg=0.56 mmoles), with a ratio Mg/Ti =5, are charged in order into a 100 ml Schlenk tube, in an argon atmosphere. This mixture is left under stirring in an argon atmosphere for 30 minutes at room temperature.

5B.1) Hydroqenation reaction 600 grams of a polymeric solution in cyclohexane of the type SBS at 7.5% by weight (with characteristics of 45% of vinyl, a percentage composition of styrene/butadiene 33/67, Mw=170000) are transferred to a 1 litre Buchi-type steel reactor; the stirring is started at 1000 rpm, hydrogen is charged up to 6 bars and the temperature thermostat-regulated at 100° C. The catalytic composition as per point 5A is added to the reactor thus prepared together with a quantity of Titanium with respect to the dry polymer equal to 120 ppm and with a ratio olefinic double bonds/moles of titanium equal to 5200. The hydrogen pressure in the reactor is brought to 24 bars. The results are indicated in Table 2.

5B.2) Hydrogenation reaction

The same procedure is carried out as in example 5B.1 and under the same conditions, the only difference being the temperature, 130° C. instead of 100° C. The results are indicated in Table 2.

COMPARATIVE EXAMPLE 6

6A) Preparation of the catalytic composition 20 ml of cyclohexane, 1.8 ml of a solution in THF of $Cp_2TiCl_2$ at a concentration of 10.36 g/l (corresponding to 0.019 grams=0.075 mmoles), 0.5 ml of a solution at 20% of magnesium dibutyl in n-heptane (corresponding to 72.9 mg=0.375 mmoles), with a ratio Mg/Ti=5, are charged in order into a 100 ml Schlenk tube, in an argon atmosphere. This mixture is left under stirring in an argon atmosphere for 30 minutes at room temperature.

6B.1) Hydrogenation reaction 600 grams of a polymeric solution in cyclohexane of the type SBS at 7.5% by weight (with characteristics of 45% of vinyl, a percentage composition of styrene/butadiene 33/67, Mw=170000) are transferred to a 1 litre Buchi-type steel reactor; the stirring is started at 1000 rpm, hydrogen is charged up to 6 bars and the temperature thermostat-regulated at 100° C. The catalytic composition as per point 6A is added to the reactor thus prepared together with a quantity of Titanium with respect to the dry polymer equal to 80 ppm and with a ratio olefinic double bonds/moles of titanium equal to 7700. The hydrogen pressure in the reactor is brought to 24 bars. The results are indicated in Table 2.

6B.2) Hydrogenation reaction

The same procedure is carried out as in example 6B.1 and under the same conditions, the only difference being the temperature, 130° C. instead of 100° C. The results are indicated in Table 2.

COMPARATIVE EXAMPLE 7

7A) Preparation of the catalytic composition 20 ml of cyclohexane, 1.35 ml of a solution in THF of $Cp_2TiCl_2$ at a concentration of 10.36 g/l (corresponding to 0.014 grams=0.056 mmoles), 0.37 ml of a solution at 20% of magnesium dibutyl in n-heptane (corresponding to 54.4 mg=0.28 mmoles), with a ratio Mg/Ti=5, are charged in order into a 100 ml Schlenk tube, in an argon atmosphere. This mixture is left under stirring in an argon atmosphere for 30 minutes at room temperature.

7B.1) Hydrogenation reaction 600 grams of a polymeric solution in cyclohexane of the type SBS at 7.5% by weight (with characteristics of 45% of vinyl, a percentage composition of styrene/butadiene 33/67, Mw=170000) are transferred to a 1 litre Buchi-type steel reactor; the stirring is started at 1000 rpm, hydrogen is charged up to 6 bars and the temperature thermostat-regulated at 100° C. The catalytic composition as per point 7A is added to the reactor thus prepared together with a quantity of Titanium with respect to the dry polymer equal to 60 ppm and with a ratio olefinic double bonds/moles of titanium equal to 10300. The hydrogen pressure in the reactor is brought to 24 bars. The results are indicated in Table 2.

7B.2) Hydrogenation reaction

The same procedure is carried out as in example 7B.1 and under the same conditions, the only difference being the temperature, 130° C. instead of 100° C. The results are indicated in Table 2.

COMPARATIVE EXAMPLE 8

8A) Preparation of the catalytic composition 20 ml of cyclohexane, 2.8 ml of a solution in THF of $Cp_2TiCl_2$ at a concentration of 10.36 g/l (corresponding to 0.29 grams=0.116 mmoles), 0.77 ml of a solution at 20% of magnesium dibutyl in n-heptane (corresponding to 112.7 mg=0.58 mmoles), with a ratio Mg/Ti=5, are charged in order into a 100 ml Schlenk tube, in an argon atmosphere. This mixture is left under stirring in an argon atmosphere for 20 minutes at room temperature.

8B.1) Hydrogenation reaction 400 grams of a solution in cyclohexane of SIS at 11.6% by weight (percentage composition of styrene/butadiene 30/70, and average Mw=53300) are transferred to a 1 litre Buchi-type steel reactor; the mixture is stirred at 1000 rpm, hydrogen is charged up to 6 bars and the temperature thermostat-regulated at 100° C. The catalytic composition as per point 8A is added to the reactor thus prepared together with a quantity of Titanium with respect to the dry polymer equal to 120 ppm and with a ratio olefinic double bonds/moles of Ti equal to 4100. The hydrogen pressure in the reactor is brought to 24 bars. The results are indicated in Table 2.

8B.2) Hydrogenation reaction

The same procedure is carried out as in example 8B.1 and under the same conditions, the only difference being the temperatures 130° C. instead of 100° C. The results are indicated in Table 2.

TABLE 2

| | Percentage conversion for the various catalysts | | | | | | | |
|---|---|---|---|---|---|---|---|---|
| Time | Comp. Ex. 5 | | Comp. Ex. 6 | | Comp. Ex. 7 | | Comp. Ex. 8 | |
| min. | 5B.1 | 5B.2 | 6B.1 | 6B.2 | 7B.1 | 7B.2 | 8B.1 | 8B.2 |
| 5 | 78.4 | 95.8 | 50.9 | 63.5 | 28.9 | 35.2 | 8.5 | 14.2 |
| 15 | 96.5 | 99 | 75.3 | 84.9 | 49.9 | 57.1 | 21.6 | 27.5 |
| 30 | 99 | * | 87.7 | 93.8 | 66.2 | 72.3 | 30.9 | 41.3 |
| 60 | * | * | 94.1 | 97.5 | 73.4 | 77.4 | 34.5 | 49.6 |
| 90 | * | * | 97.2 | 99 | 77.8 | 83.7 | 39.7 | 54.8 |
| 120 | * | * | 99 | * | 82.1 | 85.2 | 41.2 | 58.3 |
| 150 | * | * | * | * | 82.8 | 86 | 41.4 | 58.8 |
| Tem. ° C. | 100 | 130 | 100 | 130 | 100 | 130 | 100 | 130 |
| Ti ppm | 120 | 120 | 80 | 80 | 60 | 60 | 120 | 120 |
| Polymer | SBS | SBS | SBS | SBS | SBS | SBS | SIS | SIS |

COMMENTS ON THE EXPERIMENTAL RESULTS

Examples 1–3 and comparative examples 5–7 refer to the hydrogenation of polymeric solutions of SBS. A comparison of the two series of tests, carried out in the presence of the same quantities of Ti and at the same temperature, shows how the catalytic composition of the present invention is decidedly much more effective than the catalytic composition without aluminum alkyl.

Infact example 1 (carried out in the presence of $Cp_2TiCl_2$/$MgBu_2$/$AlEt_3$ refers to a hydrogenation carried out with 80 ppm of Ti; the conversions are almost total after 5 minutes both at 100° C. and 130° C. On the contrary, comparative example 6, carried out again with 80 ppm of Ti but in the presence of the system $Cp_2TiCl_2$/$MgBu_2$, gives conversion times of 120 minutes at 100° C. and 90 minutes at 130° C.

In the same way example 2 should be compared with comparative example 7 (both tests carried out with 60 ppm of Ti).

Example 3 describes the hydrogenation test in the presence of only 40 ppm of Ti. Among the comparative examples there is no similar test as after 120 minutes the hydrogenation degree is practically zero.

It should also be pointed out that, in the case of the catalytic system of the present invention, the minimum quantity of Titanium to have the maximum hydrogenation activity is 80 ppm (example 1), whereas in the case of the system $Cp_2TiCl_2$/$MgBu_2$, the minimum quantity is 120 ppm.

Test 4 and comparative example 8 both refer to hydrogenation tests of SIS copolymers, substrates which are more difficult to hydrogenate than SBS. It can be observed how in example 4 there is a conversion of 90.8% in 120 minutes whereas (with the same temperature and quantity of Ti) in comparative example 8 there is a conversion of only 58.8% after 150 minutes.

COMPARATIVE EXAMPLE 9

9A) Preparation of the catalytic composition 20 ml of cyclohexane, 2.7 ml of a solution in THF of $Cp_2TiCl_2$ at a concentration of 10.36 g/l, therefore 0.028 g (0.112 mmoles), 0.58 ml of an 0.77 M solution in n-hexane of aluminum triethyl (51.16 mg corresponding to 0.45 mmoles), with a ratio Al/Ti=4, are charged in order into a 100 ml Schlenk tube, in an argon atmosphere. This mixture is left under stirring in an argon atmosphere for 30 minutes at room temperature.

9B.1) Hydrogenation reaction 600 grams of a polymeric solution in cyclohexane of SBS copolymer at 7.5% by weight (with characteristics of 45% of vinyl, a percentage composition of styrene/butadiene 33/67, and Mw of 170000) are transferred to a 1 litre Buchi-type steel reactor; the stirring is started at 1000 rpm, hydrogen is charged up to 6 bars and the temperature thermostat-regulated at 100° C. The catalytic composition as per point 9A is added to the reactor thus prepared together with a quantity of Ti with respect to the dry polymer equal to 120 ppm and with a ratio olefinic double bonds/moles of Ti equal to 5200. The hydrogen pressure in the reactor is brought to 24 bars. The results are indicated in Table 3.

9B.2) Hydrocrenation reaction

The reaction is carried out as in 9B.1), but at 130° C. The results are indicated in table 3.

The same table 3 also indicates the data of example 1, in which only 80 ppm of Ti are used, against 120 ppm of comparative example 9.

TABLE 3

Hydrogenation data as % of conversion with a Ti/Al catalyst

| Time | Comparative Example 9 | | Example 1 | |
|---|---|---|---|---|
| min. | 9B.1 | 9B.2 | 1B.1 | 1B.2 |
| 5 | 10.6 | 12.6 | 99 | 99 |
| 15 | 17.5 | 18.2 | * | * |
| 30 | 23.9 | 25.3 | * | * |
| 60 | 27.2 | 30.1 | * | * |
| 90 | 30.4 | 31.8 | * | * |
| 120 | 32.9 | 33.4 | * | * |
| 150 | 33.5 | 34.1 | * | * |
| Tem. ° C. | 100 | 130 | 100 | 130 |
| Ti ppm | 120 | 120 | 80 | 80 |
| Polymer | SBS | SBS | SBS | SBS |

The data of table 3 clearly show how a catalyst without the magnesium compound is much less effective than that of the present invention.

What is claimed is:

1. A catalytic composition prepared by reaction between:
   (A) at least one cyclopentadienyl complex of a transition metal having general formula (I):

$(R)(R^1)M_1(R^2)(R^3)$ wherein:

R is an anion containing an $\eta^5$-cyclopentadienyl ring coordinated to $M_1$;

$M_1$ is selected from titanium, zirconium and hafnium;

$R^2$ and $R^3$, the same or different, are organic or inorganic anionic groups bound to $M_1$;

$R^1$ is selected from cyclopentadienyl and $R^2$;

with (B) an alkylating composition consisting essentially of:
   (b1) an organometallic compound having general formula (II):

$M_2(R^4)(R^5)$, wherein $M_2$ is selected from Zn and Mg, $R^4$ is selected from aliphatic or aromatic hydrocarbon radicals having from 1 to 20 carbon atoms; $R^5$ is a halogen or is equal to $R^4$; and (b2) an organoderivative of aluminum having general formula (III): $Al(R^6)_3$, wherein $R^6$ is a $C_1$–$C_{16}$ aliphatic hydrocarbon radical, and wherein the molar ratio of (I) to (b1) is from 1/1 to 1/10: and the molar ratio of (b2) to (I) is less than 1.

2. The catalytic composition according to claim 1, wherein $M_1$ is titanium.

3. The catalytic composition according to claim 1, wherein $R^2$ and $R^3$, the same or different, are selected from hydride, halide, $C_1$–$C_8$ alkyl group, $C_5$–$C_8$ cycloalkyl group, $C_6$–$C_{10}$ aryl group, $C_1$–$C_8$ alkoxyl group, $C_1$–$C_8$ carboxyl group.

4. The catalytic composition according to claim 3, wherein $R^2=R^3=Cl$.

5. The catalytic composition according to claim 1, wherein $R^1$ is cyclopentadienyl.

6. The catalytic composition according to claim 1, wherein $M_2$ is Mg.

7. The catalytic composition according to claim 1, wherein $R^4$ is selected from $C_1$–$C_{16}$ aliphatic hydro-carbon radicals.

8. The catalytic composition according to claim 7, wherein $R^4$ is selected from $C_1$–$C_8$ aliphatic hydro-carbon radicals.

9. The catalytic composition according to claim 1, wherein $R^5$ is equal to $R^4$.

10. The catalytic composition according to claim 1, wherein $R^6$ is a $C_1$–$C_8$ aliphatic hydrocarbon radical.

11. The catalytic composition according to claim 1, wherein the molar ratio between the compound having general formula (I) and the alkylating compound (b1) is from 1/3 to 1/7; the molar ratio between (b2) and (I) is from 0.3/1 to 0.9/1.

12. A process for hydrogenating olefinic double bonds present in a compound selected from the group consisting of compounds having a low molecular weight, unsaturated oligomers, polymers and copolymers, which comprises contacting the compound with hydrogen in an inert solvent, in the presence of the catalytic composition according to claim 1, for a period sufficient to obtain a selective hydrogenation of at least 50% of the olefinic double bonds.

13. The process according to claim 12, wherein said compound is selected from the group consisting of aliphatic and aromatic olefins having from 2 to 30 carbon atoms, esters of unsaturated carboxylic acids, and vinyl esters of aliphatic or aromatic acids.

14. The process according to claim 12, wherein said compound comprises a copolymer of a vinylaromatic compound with a conjugated diene.

15. The process according to claim 14, wherein said vinylaromatic compound is styrene and said conjugated diene is selected from butadiene and isoprene.

16. The process according to claim 12, wherein the compound has the general formula $(B-T-A-B)_mX$ or $(A-T-B)_mX$, wherein B are polydiene blocks, the same or different from each other, A is a polyvinylaromatic block, T is a statistic copolymeric segment consisting of diene and vinylaromatic monomeric units, X is a coupling radical with a valence "m", "m" is an integer from 1 to 20, the content of segment T being from 0 to 40% by weight.

17. The process according to any of the claims from 12 to 16, wherein the hydrogenation is carried out under hydrogen pressure from 0.1 to 10 MPa, at temperatures ranging from 20 to 150° C.

18. The process according to claim 12, wherein the inert solvent is selected from aliphatic and cycloaliphatic, saturated hydrocarbons having from 6 to 15 carbon atoms, and mixtures thereof.

19. The catalytic composition according to claim 1, wherein R is cyclopentadienyl.

20. The catalytic composition according to claim 1, wherein $R^6$ is $C_1$–$C_8$.

21. The catalytic composition according to claim 20, wherein $R^6$ is $C_1$–$C_8$.

* * * * *